July 11, 1961  C. G. FERRARI  2,992,111
BREAD IMPROVER COMPOSITIONS
Filed June 27, 1958
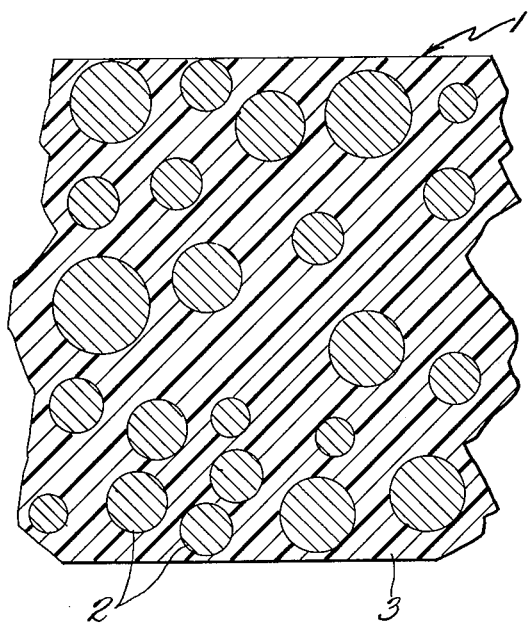
INVENTOR
CHARLES G. FERRARI
BY D.C. Roylance
ATTORNEY

United States Patent Office 2,992,111
Patented July 11, 1961

2,992,111
BREAD IMPROVER COMPOSITIONS

Charles G. Ferrari, Evanston, Ill., assignor to J. R. Short Milling Company, Chicago, Ill., a corporation of Illinois
Filed June 27, 1958, Ser. No. 745,120
2 Claims. (Cl. 99—91)

This invention relates to novel bread improver compositions and particularly to such compositions comprising both an inorganic bread improver compound and a solid particulate bread improver material which is sensitive to such compound.

As disclosed in my copending application, Serial Number 744,897, filed concurrently herewith, I have discovered that certain bread improver materials, and particularly the enzymatically active materials, are subject to being damaged or degraded when stored for prolonged periods in the presence of inorganic bread improver compounds, particularly calcium peroxide and dicalcium phosphate. It appears that, when particles of the enzymatically active material is placed in contact with or close proximity to particles of such inorganic compounds, there results in periods as short as two months, a marked decrease in the enzyme activity of the sensitive material. Since, for normal commercial purposes, a bread improver composition must have a safe storage life on the order of six months, it is clear that satisfactory enzymatically active bread improver compositions cannot be based on a simple admixture of an enzymatically active material with an inorganic compound. The situation is made more difficult by the fact that it is frequently advantageous and highly desirable to employ, as the enzymatically active material, a legume flour or meal containing all or part of its natural fat content. Since such fat content comprises a relatively high proportion of unsaturated compounds, there is frequently a marked tendency toward formation of rancidity, when inorganic compounds like calcium peroxide are present.

In the aforementioned copending application, I have disclosed that such difficulties can be overcome by associating the inorganic compound with a normally solid edible protective material capable not only of preventing that compound from damaging the enzymatically active or other sensitive material during storage but also of delaying the action of the inorganic bread improver compound during mixing of the dough to which the composition is added. Of the materials disclosed in that application, the most advantageous are certain water-emulsifiable materials which require mechanical working, of the type involved during mixing of the dough, to accomplish prompt removal of the protective material. The present invention is directed to bread improved compositions, of the general type referred to, employing as the protective agent a water-soluble material capable of being speedily removed by the aqueous phase of the dough. Referring to the accompanying drawings for clarity of explanation, the novel bread improver compositions of this invention involve, in admixture with a particulate sensitive bread improver material such as an enzymatically active material, a particulate material each particle 1 of which comprises a plurality of particles 2 of a finely divided inorganic bread improver compound fully covered by and distributed through a solid matrix 3 of water soluble protective material.

The finely divided inorganic bread improver compound employed can be calcium peroxide, the phosphates of calcium and ammonium, particularly monocalcium phosphate, dicalcium phosphate, diammonium phosphate and mixtures thereof, the persulfates of calcium, potassium, sodium and ammonium, potassium bromate, potassium iodate, ammonium sulfate, calcium sulfate, ammonium chloride, sodium chlorite, and calcium carbonate. As the protective material, I can employ any normally solid, edible, water soluble material selected from the group consisting of the edible gelatins, gelatinized starch, dextrinized starch, the edible water soluble gums, such as guar gum and locust bean gum, and the edible water-soluble compounds of methyl cellulose, including sodium carboxymethyl cellulose and hydroxy propyl methyl cellulose ether. As sensitive materials, subject to being damaged by contact with the inorganic compounds, I can employ, for example, any of the legume enzyme material capable of both bleaching carotinoids and modifying dough properties, such materials being the enzymatically active flours and meals obtained from soybeans, peas, peanuts, beans or lentils. Similarly, any of the commercially available enzyme preparations, such as the fungal enzyme concentrates, are suitable.

In preparing the protected, inorganic bread improver compound, a concentrated solution of the water-soluble material is first made and the desired amount of firmly divided inorganic compound mixed therein. The resulting mixture is then formed into any suitable preliminary shape, dried and disintegrated to a suitable particle size. Thus, the mixture can be sheeted on a suitable heated surface and removed, in the form of fragments, by means of a ductor blade, the fragments either being combined in the bread improver composition directly or first disintegrated in particles which, though small, are many times larger than the fine particles of the inorganic compound.

While, during the step of disintegrating the preformed protected product, some particles of the inorganic compound become partially exposed, the number of exposed particles and their total exposed area are so small as to be, for practical purposes, insignificant.

The size of the particles or fragments 1 can vary within wide limits. Since the inorganic bread improver compounds are very finely divided, frequently considerably finer than 100 mesh, it is possible for the protected inorganic compound of this invention to have a particle size in the range of 50–100 mesh. On the other hand, the particles 1 can be larger, even to the extent to being granules, or even chunks, so long as the material can be satisfactorily handled in the bakery.

Sheeting is a convenient way to produce the preforms of water soluble material and inorganic compound, in accordance with the invention, since apparatus for carrying out such a procedure is generally available. However, other preliminary procedures can be employed. Thus, the material can be cast into a block and then broken up into fragments of the proper size. Also, it is possible to spray the thick solutions, carrying the particles of inorganic compound, into a drying atmosphere to produce a pearled product. If preforms of substantial size are first made, it is not critical how such bodies be disrupted into relatively fine fragments or particles, so long as the desired particle size can be obtained by the method employed. In this connection, the sheeting procedure is particularly satisfactory because, if sheeting be carried out on a heated roll, fragmentation can be accomplished simply by removing the material from the surface of the roll with a scraper blade.

The following examples will illustrate the invention:

Example 1

Ten grams of food grade corn starch is gelatinized by boiling for a few minutes with 100 cc. of water and the resulting paste is cooled to about 50° C. To the cooled paste is then added, with continual stirring, 35 grams of food grade calcium peroxide (60% $CaO_2$, average particle size less than 200 mesh). The resulting calcium peroxide-loaded paste is spread on the surface of a glass plate, allowed to dry at room temperature and then scraped from the plate in relatively large fragments. The fragments so obtained are gently ground in a mortar to an average particle size in the range of 50–80 mesh to give a particulate product consisting of calcium peroxide substantially completely embedded in solid fragments of the water soluble starch.

A bread improver composition is now prepared by blending 300 grams of starch-protected calcium peroxide product, prepared as explained above, with 4,000 grams of full fat enzymatically active soy flour and 5,700 grams of partially dextrinized corn flour, as an extender. A control composition is prepared by blending 250 grams of food grade calcium peroxide of the same purity and particle size above referred to with 4,000 grams of full fat enzymatically active soy flour and 5,750 grams of partially dextrinized corn flour. Samples of both the control composition, employing the unprotected calcium peroxide, and the novel composition of this example, comprising the starch-protected calcium peroxide, are stored, some at room temperature and some at 98° F., and observed from time to time for rancidity and tested for lipoxidase activity of the soy flour constituent. In the samples of the novel composition of this example, no rancidity, and no undue lipoxidase deactivation, is observed over a storage period of six months. Samples of the conventionally prepared control composition show observable rancidity, developed in the fat content of the soy flour, within periods as short as 2–3 months, particularly in those samples stored at the higher temperature. Similarly, the samples of conventionally prepared compositions exhibit a loss of lipoxidase activity amounting to as much as 60–65% in times as short as 2 or 3 months, such period being, at best, about half of the storage life necessary for a commercially satisfactory product.

*Example 2*

Sixty grams of food grade gelatin obtained from animal skins is dissolved in one liter of hot water and the solution cooled to about 45° C. Two hundred grams of food grade calcium peroxide (60% $CaO_2$, average particle size less than 200 mesh) is then added to the gelatin solution with continual stirring to obtain a thick suspension of the calcium peroxide. The suspension is sheeted on a hot steel roll, being dried by the roll heat, and is flaked off of the roll by means of a scraper blade. The flakes are then gently ground to about 50 mesh to yield a particulate product, each particle of which comprises fine particles of calcium peroxide distributed through a solid matrix of gelatin.

A complete bread improver composition is then prepared by blending 150 grams of the gelatin-protected calcium peroxide with 4,000 grams of full fat enzymatically active soy flour and 5,850 grams of partially dextrinized corn flour, as an extender. A control composition is prepared in the same manner as explained in Example 1. Comparative storage tests are then carried out, the novel composition of this invention again showing no material rancidity formation and no undue enzyme deactivation over storage periods as long as 6 months, the control composition again exhibiting both undue rancidity and excessive enzyme deactivation.

I claim:

1. A bread improver composition comprising a mixture of (1) at least one solid inorganic bread improver compound selected from the group consisting of calcium peroxide, the phosphates of calcium and ammonium, the persulfates of calcium, potassium, sodium and ammonium, potassium bromate, potassium iodate, ammonium sulfate, calcium sulfate, ammonium chloride, sodium chlorite and calcium carbonate, substantially all particles thereof being carried by and substantially completely embedded in solid, discrete bodies of a water-soluble, edible protective material selected from the group consisting of gelatin, gelatinized starch, dextrinized starch, water-soluble natural gums and the edible water-soluble compounds of methyl cellulose, and (2) particles of an enzymatically active material the enzyme content of which is sensitive to said inorganic compound, said protective material being effective to physically separate said inorganic compound and said enzymatically active material and thereby prevent damage to said enzyme content during storage of the composition but being capable of being removed by the aqueous phase of a dough during mixing thereof.

2. The composition of claim 1 wherein said enzymatically active material is enzymatically active soy flour containing at least a substantial proportion of its natural fat content.

References Cited in the file of this patent

UNITED STATES PATENTS

| | | |
|---|---|---|
| 2,183,053 | Taylor | Dec. 12, 1939 |
| 2,185,368 | Bowen | Jan. 2, 1940 |
| 2,288,410 | Lippman | June 30, 1942 |
| 2,321,673 | Hall | June 15, 1943 |
| 2,736,654 | Selman et al. | Feb. 28, 1956 |

OTHER REFERENCES

Water-Soluble Gums: 1947, by Mantel, Reinhold Publishing Corp. (New York), pp. 192 to 194.

Soybeans and Soybean Products: 1950, by Markley, Interscience Publishers Inc. (New York), vol. I, page 284.